United States Patent Office 3,023,199
Patented Feb. 27, 1962

3,023,199
POLYVINYL-ALCOHOL RESIN RESISTANT TO WATER AND METHOD OF MAKING IT
John O. Hawthorne, Pittsburgh, and Myron H. Wilt, Monroeville, Pa., assignors to United States Steel Corporation, a corporation of New Jersey
No Drawing. Filed June 8, 1959, Ser. No. 818,520
2 Claims. (Cl. 260—91.3)

This invention relates to polyvinyl-alcohol resin and, in particular, to a modified resin of this type which resists the action of water, and to a method of making the modified resin.

Polyvinyl-alcohol resins are used extensively in various ways because of their desirable properties. They suffer, however, from a serious disadvantage, viz., their susceptibility to the action of water. That is to say, after the resin has been shaped or applied and cured, it is subject to solution or softening by water. In fact, water is the solvent most widely used for rendering the dry granular compound smoothly flowable.

We have discovered that polyvinyl-alcohol resins may be made more resistant to water by acetalization with 2,2'-biphenyldicarboxaldehyde or its derivative, 5-hydroxy-5H-dibenz[c, e]azepine, in the presence of an acid catalyst. Presumably this causes cross-linking to increase the stability in contact with water. Small amounts of the dialdehyde or azepine will suffice to impart such stability to the resin and the treatment involved is extremely simple. The dialdehyde may be mechanically dispersed in the resin since it is water-insoluble. The azepine, however, readily forms an acid salt which is water soluble. Hydrolysis of the salt yields the dialdehyde.

The azepine and a method for its manufacture are disclosed in British Patent 860,907. They are also disclosed and claimed in Hawthorne et al. Serial No. 797,330, filed March 5, 1959.

A complete understanding of the invention may be gained from the following detailed explanation of several typical examples thereof.

EXAMPLE 1

To three 50-gram samples of 10% aqueous polyvinyl alcohol (Elvanol 72–60, du Pont) were added .05 gram, .25 gram and .5 gram (1, 5 and 10% of resin weight), respectively, of 2,2'-biphenyldicarboxaldehyde. The mixtures were warmed and stirred until the dialdehyde was well dispersed and no large particles were noticeable. Kaolin clay (50 grams) was blended into each of the mixtures and also into 20 grams of the 10% polyvinyl alcohol solution alone, with vigorous agitation until a smooth dispersion of the clay was obtained. Hydrochloric acid (1.2 ml., 1 part concentrated acid:1 part water) was stirred into each of the samples containing the dialdehyde. Using a doctor blade, films (0.038 inch) were drawn onto fairly dense paperboard. The coatings were cured at 110° C. for 10 minutes, then cooled to room temperature.

A piece of black paper was placed over a part of the pigmented coating. Water (two to three drops) was placed on the coating adjacent to the black paper. The wet area was stroked lightly with the index finger from the coating onto the black paper. The number of rubs necessary to carry pigment onto the paper was determined for each coating. Pigment was carried onto the paper in three or four rubs from the plain polyvinyl-alcohol coating. No noticeable pigment was removed in fifty rubs on the dialdehyde-treated polyvinyl-alcohol coatings.

EXAMPLE 2

Kaolin clay (62 grams) was added to four samples (16.7 grams) of 15% aqueous polyvinyl-alcohol solutions (Elvanol 72–60, du Pont) and blended into each solution. To three of these mixtures, solutions of 5-hydroxy-5H-benz[c, e]azepine (0.025, 0.125 and 0.25 gram, i.e., 1, 5 and 10% by weight of resin) in water (8.3 ml.) and hydrochloric acid (1.2 ml., 1 part concentrated acid:1 part water) were added and mixed thoroughly. Water (9.5 ml.) alone was added to the fourth mixture. Coatings were drawn and treated as in Example 1. Again, no noticeable pigment was removed after fifty rubs with the coatings containing 1, 5 and 10% azepine based upon the polyvinyl alcohol content. Pigment was removed in three or four rubs on the untreated coating. Thus, a high degree of insolubilization of the coatings was again observed.

EXAMPLE 3

To aqueous 10% solutions (50 grams) of polyvinyl alcohol were added 1, 5 and 10%, respectively, (based on the weight of polyvinyl alcohol) of 2,2'-biphenyldicarboxaldehyde. Hydrochloric acid (0.6 ml. of 1 part concentrated acid:1 part water) was added to each of the mixtures, and films (0.038 inch) were drawn on glass. A film of plain 10% polyvinyl alcohol was prepared in a similar manner as a control. The films were cured at 110° C. for 18 minutes. Difficulty was encountered in stripping the films because of their strong adhesion to the glass. The films were kept at room temperature for four hours. Because of the adhesion problem, films for drying at room temperature (24 hours) were drawn on a sheet of "Teflon" resin from which stripping was simplified.

Two 15 by 40 mm. pieces were cut from each film. One piece from each film was boiled in water for twenty minutes. The others were soaked in water at room temperature for one hour. The pieces were then placed flat on glass and remeasured. The increase in area showed the susceptibility to water. The results were as follows:

*Table 1*

2, 2'-BIPHENYLDICARBOXALDEHYDE CONCENTRATION BASED ON POLYVINYL ALCOHOL

|  | 0% | 1% | 5% | 10% |
|---|---|---|---|---|
| Films dried at 110° C.: |  |  |  |  |
| Percent increase in area of films in water at room temperature | 149 | 55 | 38 | 35 |
| Percent increase in area of films in water at the boiling point | (¹) | 112 | 63 | 52 |
| Films dried at room temperature: |  |  |  |  |
| Percent increase in area of films in water at room temperature | 122 | 47 | 28 | 22 |
| Percent increase in area of films in water at the boiling point | (¹) | 58 | 33 | 25 |

¹ Dissolved.

The films compounded with 2,2'-biphenyldicarboxaldehyde displayed a significant resistance to water, as shown by much reduced swelling as compared with the untreated polyvinyl-alcohol films.

EXAMPLE 4

Azepine samples (0.0375, 0.1875 and 0.3750 gram) were dissolved in hydrochloric acid (0.9 ml., 1 part concentrated acid:1 part water) and water (12.5 grams). To each solution was added an aqueous 15% polyvinyl-alcohol solution (25 grams). The final mixes contained 1, 5 and 10% azepine based upon the polyvinyl alcohol weight. Films were cast on sheets of "Teflon" resin and tested as in Example 3. The following increases in areas were obtained:

*Table II*

5-HYDROXY-5H-DIBENZ[c, e]AZEPINE CONCENTRATION BASED ON POLYVINYL ALCOHOL CONTENT

|  | 0% | 1% | 5% | 10% |
|---|---|---|---|---|
| Films dried at 110° C.: | | | | |
| Percent increase in area of film in water at room temperature | 85 | 44 | 25 | 20 |
| Percent increase in area of film in water at the boiling point | (1) | 122 | 63 | 44 |
| Films dried at room temperature: | | | | |
| Percent increase in area of film in water at room temperature | 122 | 44 | 28 | 25 |
| Percent increase in area of film in water at the boiling point | (1) | 56 | 33 | 25 |

1 Dissolved.

Thus, polyvinyl alcohol films can be made less susceptible to water by reaction with 5-hydroxy-5H-dibenz-[c, e]azepine in the presence of an acid.

The dialdehyde or azepine may be used in amounts from 0.5 to 15% of the weight of the polyvinyl-alcohol resin. We prefer to employ about 8%. The amount of hydrochloric acid used may vary between 0.1 and 1% by weight of resin, preferably about .5%. Instead of hydrochloric acid we may employ other mineral acids such as sulphuric or phosphoric acid, in similar amounts.

It will be evident that the invention provides a polyvinyl-alcohol resin having a marked resistance to the action of water and a simple method of making it. The invention is also applicable to modified polyvinyl-alcohol resins such as polyvinyl-butyral resin.

Although we have disclosed herein the preferred embodiment of our invention, we intend to cover as well any change or modification therein which may be made without departing from the spirit and scope of the invention.

We claim:

1. A method of making polyvinyl-alcohol resin which consists in mixing with an aqueous polyvinyl-alcohol solution from .1 to 1% by weight of the dissolved polyvinyl-alcohol resin, of an acid selected from the group consisting of hydrochloric, sulphuric and phosphoric and from 0.5 to 15% by weight of polyvinyl-alcohol resin, of 5-hydroxy-5H-dibenz[c, e]azepine, and permitting reaction of the mixture to cure it.

2. Polyvinyl alcohol resin made by adding to an aqueous polyvinyl-alcohol solution from .1 to 1% by weight of the polyvinyl-alcohol resin, of an acid selected from the group consisting of hydrochloric, sulphuric and phosphoric, and from 0.5 to 15% by weight of the polyvinyl-alcohol resin, of 5-hydroxy-5H-dibenz[c, e]azepine and permitting reaction of the mixture to cure it.

References Cited in the file of this patent

UNITED STATES PATENTS

| 2,169,250 | Izard | Aug. 15, 1939 |
| 2,749,208 | Cline | June 5, 1956 |